Aug. 14, 1934.  J. M. HEATH  1,969,844
SHOCK ABSORBING VEHICLE FRAME
Filed April 25, 1932  6 Sheets-Sheet 1
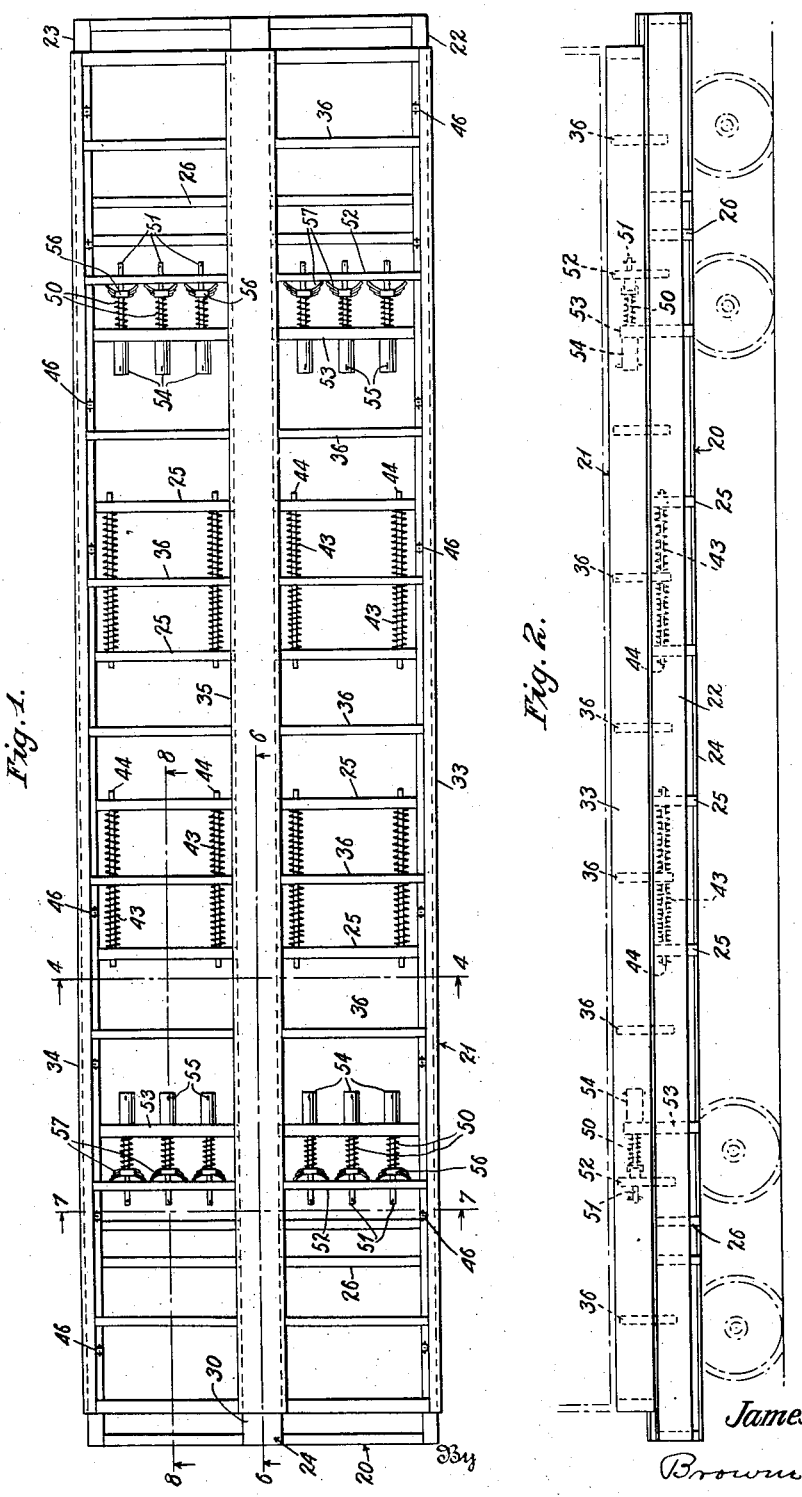

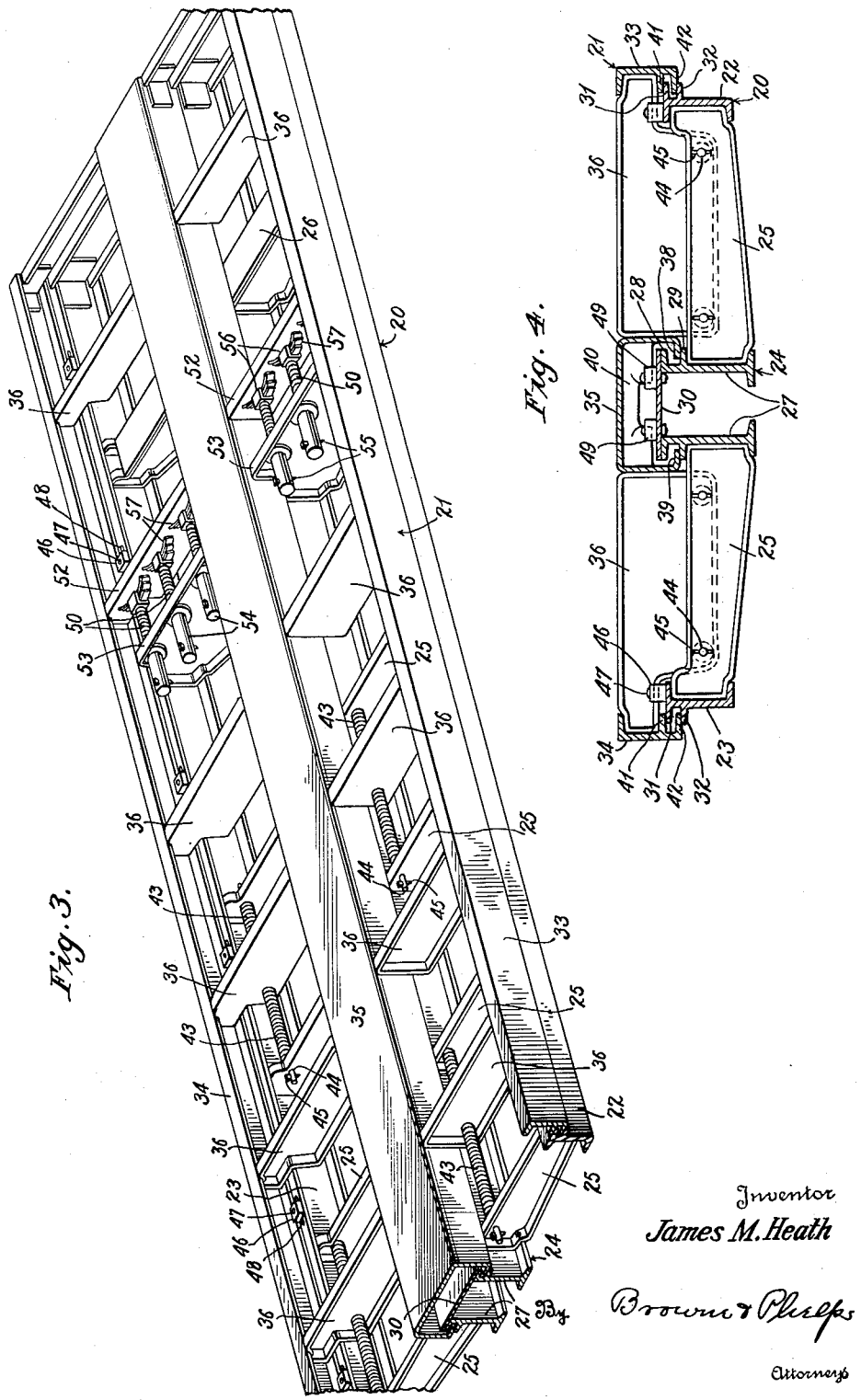

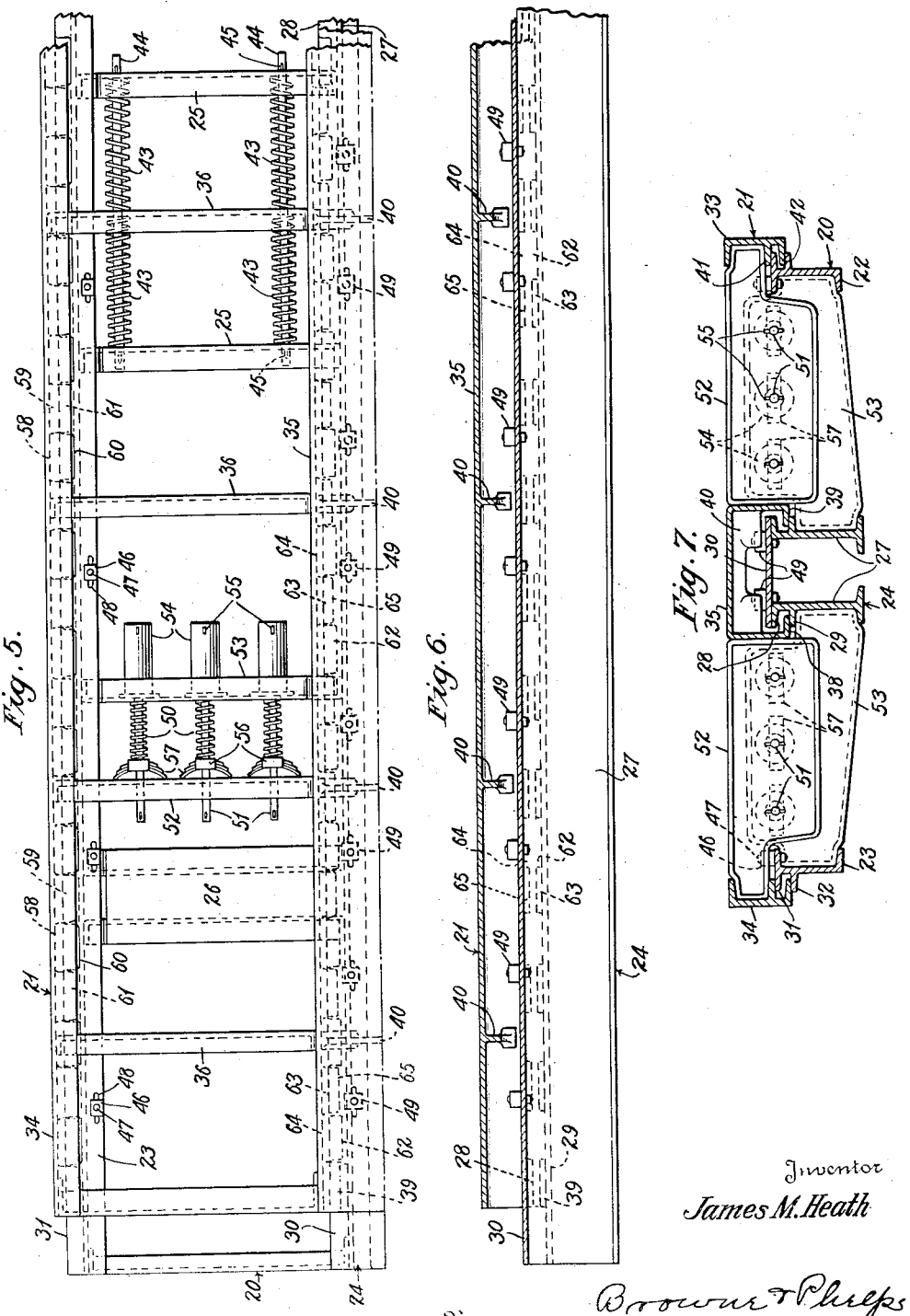

Aug. 14, 1934.  J. M. HEATH  1,969,844
SHOCK ABSORBING VEHICLE FRAME
Filed April 25, 1932  6 Sheets-Sheet 4
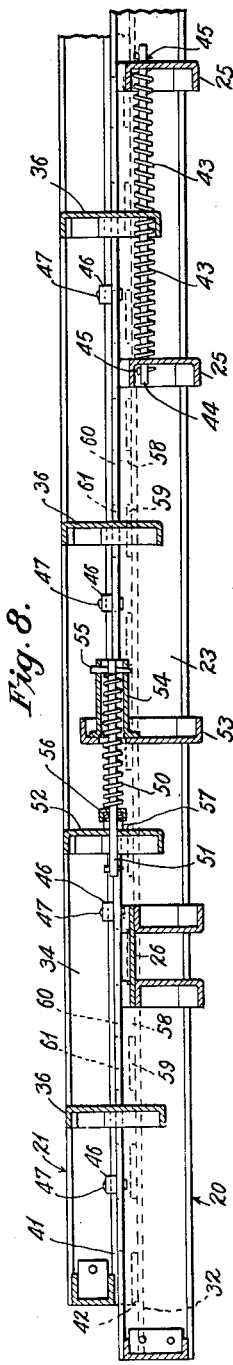
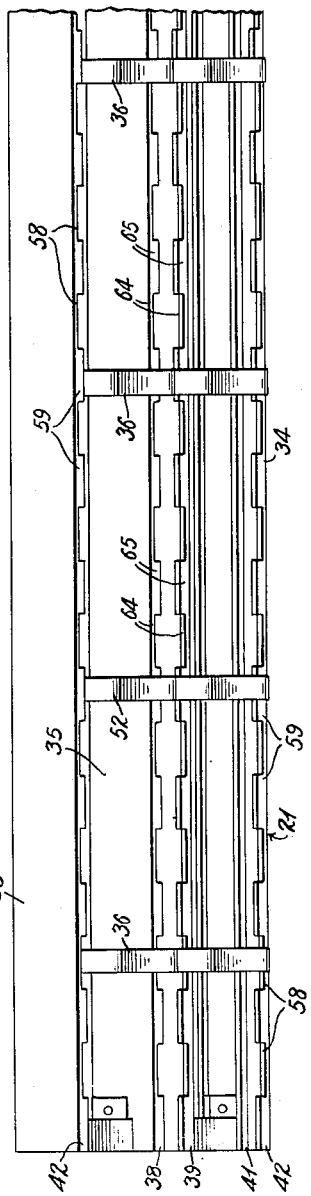
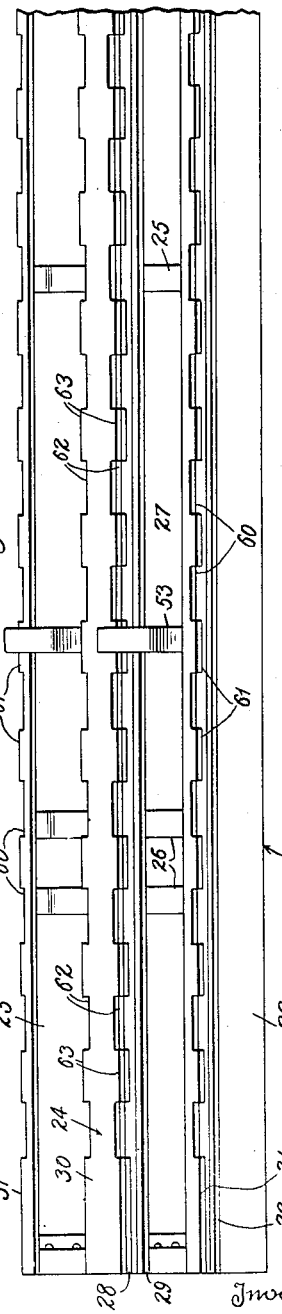
Inventor
James M. Heath

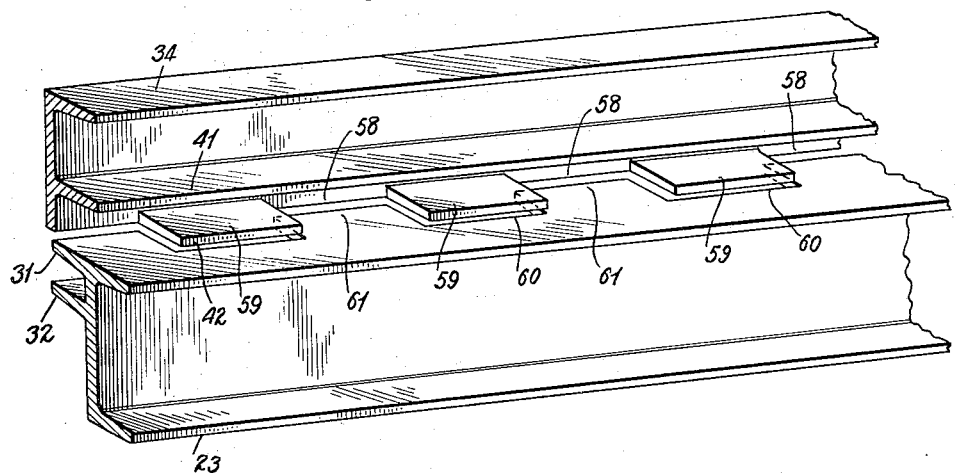
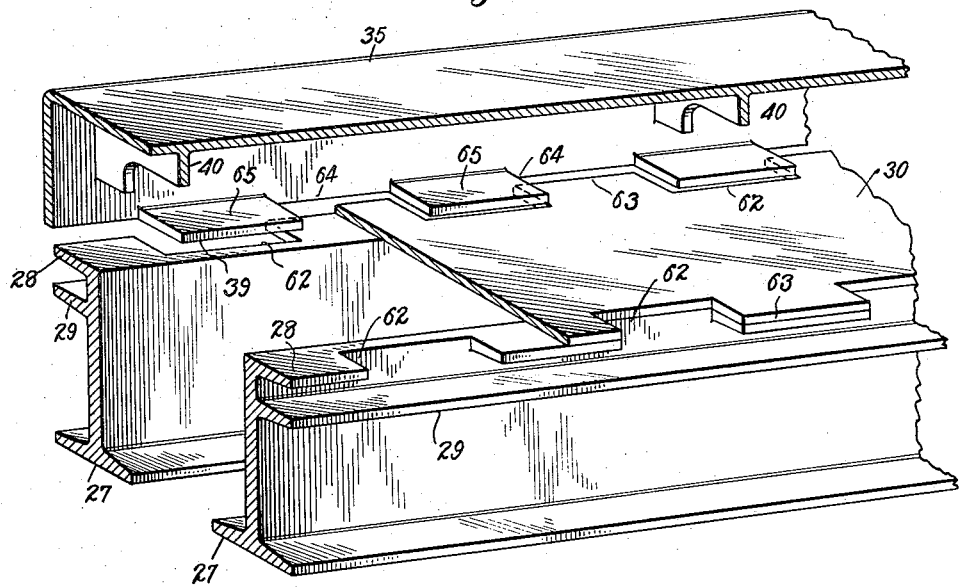
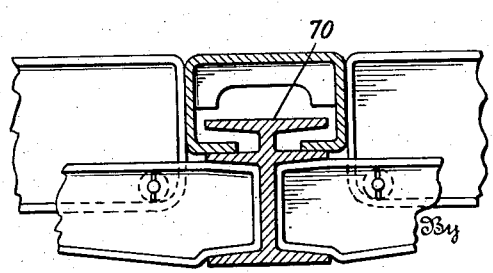

Aug. 14, 1934.  J. M. HEATH  1,969,844
SHOCK ABSORBING VEHICLE FRAME
Filed April 25, 1932  6 Sheets-Sheet 6
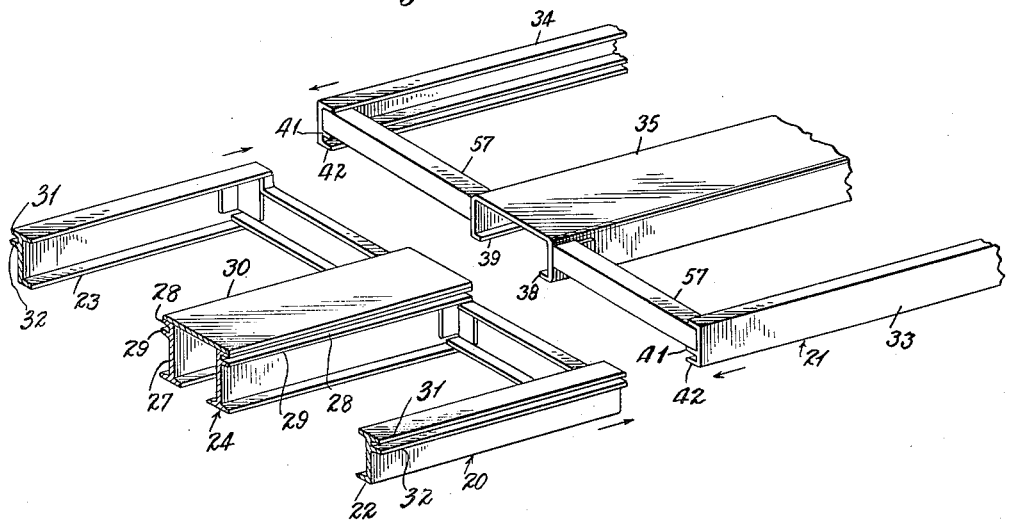
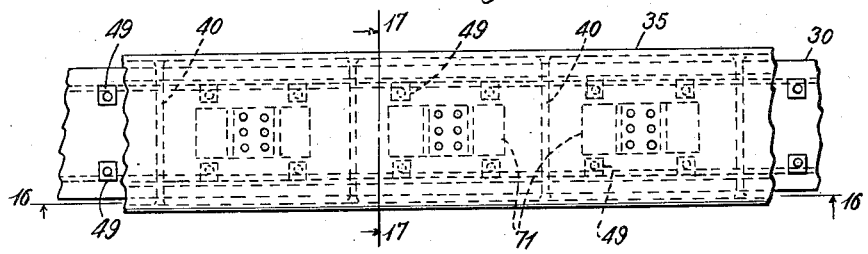
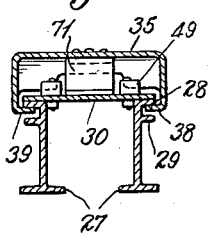
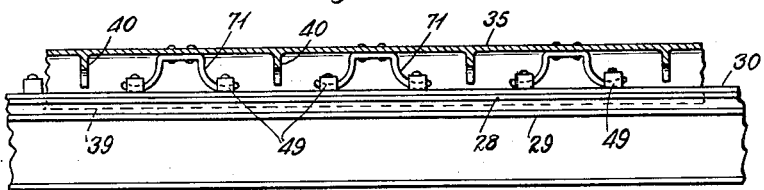
Inventor
James M. Heath
By Brower & Phelps
Attorneys Patented Aug. 14, 1934

1,969,844

UNITED STATES PATENT OFFICE 1,969,844

SHOCK ABSORBING VEHICLE FRAME

James M. Heath, Philadelphia, Pa.

Application April 25, 1932, Serial No. 607,404

9 Claims. (Cl. 105—454)

The invention relates to shock absorbing vehicle frames and has as an object the provision of a vehicle frame particularly adapted for railway cars having means to protect the contents and the body of the vehicle from the effects of excessive shocks of traffic.

It is a further object of the invention to provide an improved form of vehicle frame wherein a body frame is movable upon a wheeled frame or under-frame with means to return the body frame to its normal condition of registration with the under-frame after displacement thereof by shocks as buffing, braking, or the like.

It is a further object of the invention to provide a frame of the character referred to wherein the body frame and the under-frame may be separately constructed and afterwards put together.

It is a further object of the invention to provide a frame of the character referred to having spring means inbuilt to supplement the action of the usual truck springs of a railway car.

The invention may be embodied in a freight or passenger railway car and some features of the invention may be used in road vehicles as busses, trucks or the like.

Further objects of the invention will appear from the following description when read in connection with the accompanying drawings showing illustrative embodiments of the invention, and wherein:—

Fig. 1 is a plan view of the frames of the invention, the body of the vehicle being omitted;

Fig. 2 is a side elevation of the structure of Fig. 1;

Fig. 3 is a detail perspective view showing a portion of the two frames in assembly;

Fig. 4 is a vertical transverse section on line 4—4 of Fig. 1 drawn to an enlarged scale;

Fig. 5 is a detail plan view of substantially one-fourth of the assembled frames upon an enlarged scale;

Fig. 6 is a vertical section on line 6—6 of Fig. 1;

Fig. 7 is a transverse section on line 7—7 of Fig. 1 upon an enlarged scale;

Fig. 8 is a detail vertical section on line 8—8 of Fig. 1 upon an enlarged scale;

Figs. 9 and 10 are side elevations of the body and wheeled frame respectively, the frame in Fig. 9 being tilted up and the frame in Fig. 10 being tilted down at the edge toward the observer showing the parts in the position of registration which they must occupy for assembly.

Figs. 11 and 12 are detail perspective views of the side and center sills respectively.

Fig. 13 is a detail transverse section on the two frames at the center sill illustrating a modified form of center sill;

Fig. 14 is a detail perspective view of portions of the two frames placed for assembly;

Fig. 15 is a plan view of a portion of the center sill of the two frames showing springs which may be introduced in one form of the invention;

Fig. 16 is a longitudinal section on line 16—16 of Fig. 15; and

Fig. 17 is a transverse section on line 17—17 of Fig. 15.

As shown the device comprises a wheeled or under-frame 20 and a body frame 21. The under-frame is shown as comprising side sills 22, 23 and a center sill 24 united by cross sills 25. A bolster is shown at 26 in Fig. 3 also extending between the side sills 22, 23. The center sill is shown as made up of modified rolled structural steel members 27 shown in Fig. 4 as comprising two upper spaced longitudinal flanges 28, 29 defining grooves therebetween, the grooves in the opposite members 27 facing outwardly. To complete the center sill in this form, there is shown a cover plate 30 united to the upper surface of the flanges 28 in any suitable manner.

The side sills 22, 23 are also formed of modified rolled structural steel members each having a pair of outwardly projecting flanges 31, 32 defining a groove therebetween.

In the form of the invention illustrated the grooves between the flanges 31, 32 are shown as opening outwardly upon the respective sides of the frame, which is a preferred construction but not an essential one.

The body frame 21 is shown as comprising side sills 33, 34 and a center sill 35 united by cross sills 36. The center sill 35, as most clearly shown in Fig. 4, is formed of a box girder having an open side defined by inwardly projecting flanges 38, 39 lying within the grooves defined by the longitudinal flanges 28, 29 upon the under-frame center sill. To stiffen the sill 35 there are shown a plurality of transverse plates 40 secured to the inner surface of the upper portion thereof. The side sills 33, 34 are shown as formed at their lower edges with inwardly projecting longitudinal flanges 41, 42, also defining a groove, and the flanges 42 are shown as lying within the groove between the flanges 31, 32.

The cross sills 25 are shown as terminating below the upper plane of the wheeled frame and the cross sills 36 of the body frame are shown as projecting below the plane of the upper edges of the sills 25 to provide lapping parts of the sills upon the two frames.

To cushion shocks and to restore the upper frame to its normal position of registration with the lower frame after displacement caused by shocks of traffic, there are shown springs 43 mounted upon rods 44 each projecting through one of the sills 36 and through the two contiguous sills 25 and secured therein. The securing means shown comprises keys 45 passed through slots in the ends of rods 44.

To limit the travel of the upper frame responsive to shocks, there are shown stop blocks 46 secured to side sills 22, 23 and desirably adjustable therein as by means of bolts 47 passing through slots 48 in a flange of the sill. The stop members 46 are adapted to contact with the cross sills 36 upon the upper frame at the limit of relative movement allowed to the two frames. To further assist in limiting such movement, there are shown stops 49 similarly bolted to the cover plate 30 of the center sill to be contacted by the cross members 40.

Further spring means to cushion shocks and restore registration between the frames are shown by way of springs 50 mounted upon rods 51 passing through a cross sill 52 carried by the upper frame and a special cross sill 53 carried by the under-frame. In this instance the cross sill 53 is shown as projecting upwardly into overlapping relation with the cross sill 52. As shown the rods 51 extend into sockets 54 carried by the sill 53 and are secured therein as by means of pins 55. The springs 50 extend into said sockets and abut against the pins 55 therein. The remaining ends of the springs 50 are shown as abutting against saddles 56 mounted upon leaf springs 57 bearing against the sill 52. It will be understood that either of the forms of springs 43 or 50 may be utilized alone or the shown combination of the two may be used.

In the assembly of the two frames as so far described, the frames completed, except for the application of the over-lapping cross sills from one of the frames, are placed in the position shown in Fig. 14, the upper frame being held in assembly by means of cross members 57 and the flanges 31 and 42 and 39 being entered into the respective grooves, the upper frame is moved lengthwise to a proper position of registration, after which the omitted cross sills are introduced and assembled with the spring structures and the stop plates bolted upon the sills.

To avoid the necessity of assembling the cross sills after assembly of the frames and also to provide for more ready removal of the body frame at need, the modification illustrated in Figs. 5 to 12 inclusive is provided. In accordance with this modification and as most clearly shown in Figs. 9 to 12 inclusive, the flanges 42 of the sills 33, 34 are cut away as at 58 to provide projecting portions 59 and the flanges 31 of the side sills 22, 23 are complementarily cut away to provide spaces 60, slightly exceeding in extent the portions 59 and leaving therebetween the portions 61.

The flanges 28 of the center sill are likewise cut away as at 62, the cover plate 30 being likewise cut through providing the projecting portions 63 and the flanges 38, 39 of the center sill 35 of the body frame are cut away as at 64 leaving the intervening portions 65 of slightly less extent than the cut away portions 62 of the flanges 28.

When so formed the body frame completely assembled may be placed in the offset position illustrated in Figs. 9 and 10 when the body frame may be lowered into contact with the wheeled frame and moved longitudinally a distance equal to the length of the portions 69 and 55 to underlie the portions 61 and 63 upon the under-frame. Thereafter the springs 43 or 50 may be applied and the stop blocks 46, 49 may be added and adjusted when the frames are ready for service.

A modified form of center sill formed of a modified I-beam 70 is shown in Fig. 13 which may be utilized instead of the box girder type shown in the structure already described.

In Figs. 15 to 17 inclusive there are shown springs 71 carried by the center sill 35 adapted to bear upon the cover plate 30 between the stop blocks 49 to supplement the spring action of the usual truck springs of the vehicle. When these springs are used the flanges 38, 39 are as shown in Fig. 17, normally clear from the flanges 29 and at least one of the flanges 42 should be borne clear from the flanges 32.

Minor changes may be made in the physical embodiments of the invention within the scope of the appended claims without departing from the spirit of the invention.

I claim:

1. A vehicle comprising, in combination: a wheeled frame formed with sills having laterally projecting longitudinal flanges substantially coextensive therewith; a body frame movably mounted thereon and formed with sills having laterally projecting flanges underlying and substantially coextensive with said first named flanges to prevent vertical displacement of the body frame; said frames each presenting coacting weight bearing surfaces; and resilient means coacting with said frames to restore normal registration thereof after displacement.

2. A vehicle comprising, in combination: a wheeled frame formed with sills having laterally projecting flanges; a body frame movably mounted thereon and formed with sills having laterally projecting flanges underlying and substantially coextensive with said first named flanges to prevent vertical displacement of the body frame; said frames each presenting coacting weight bearing surfaces; resilient means coacting with said frames to restore normal registration thereof after displacement; and resilient means between certain of said coacting weight bearing surfaces.

3. A vehicle comprising, in combination: a wheeled frame comprising side sills each formed with a laterally projecting flange; a body frame movably mounted on said wheeled frame comprising side sills each having a laterally projecting flange underlying the respective first named flanges to prevent vertical displacement of the body frame; said frames presenting coacting weight bearing surfaces; and resilient means coacting between said frames to restore the normal condition of registration thereof after displacement.

4. A vehicle comprising, in combination: a wheeled frame comprising side sills and a center sill each formed with laterally projecting flanges; a body frame movably mounted on said wheeled frame and comprising side sills and center sills each formed with flanges projecting laterally counter to the respective first named flanges and each underlying one thereof to prevent vertical displacement of the body frame; said sets of sills presenting coacting weight bearing surfaces; and resilient means coacting between said frames to restore normal registration thereof after displacement and to cushion shocks of such displacement.

5. A vehicle comprising in combination: a wheeled frame comprising side sills each formed with a pair of laterally projecting flanges defining a groove therebetween; a body frame movably mounted on the wheeled frame and comprising side sills superposed upon the respective first named sills and each formed with flanges defining a groove opening in a direction counter to the respective first named grooves; one groove defining flange upon each of said sills engaged in the groove upon the opposed sill to prevent vertical displacement of the body frame; and resilient means coacting between said frames to restore normal condition of registration after displacement.

6. A vehicle comprising in combination: a wheeled frame comprising longitudinal sills formed with laterally projecting flanges and with cross sills; a body frame mounted thereon for longitudinal movement, comprising longitudinal sills superposed on said first named sills, formed with laterally projecting flanges substantially coextensive with and underlying said first named flanges to prevent vertical displacement of the body frame and with cross sills, their bottom edges lying below the plane of the upper edges of said first named cross sills; and resilient means coacting between the overalpping portions of contiguous cross sills upon the respective frames to restore the frames to normal position after displacement.

7. A vehicle comprising in combination: a wheeled frame comprising longitudinal sills formed with laterally projecting flanges; a body frame movably mounted on said wheeled frame comprising longitudinal sills overlying said first named sills and formed with laterally projecting flanges underlying said first named flanges to prevent vertical displacement of the body frame; resilient means coacting between said frames to restore their normal relative position after displacement comprising spring means transmitting pressure between at least one pair of upper and lower sills.

8. A vehicle comprising in combination: a wheeled frame comprising longitudinal sills formed with laterally projecting flanges having portions cut away at intervals; a body frame movably mounted on said wheeled frame and formed with longitudinal sills overlying the first named sills and formed with laterally projecting flanges having portions cut away at intervals; the remaining portions of each of said sets of flanges being dimensioned to pass through the cut away portions on the contiguous flanges; said frames assembled with the said remaining portions of the body frame flanges underlying the like portions upon the wheeled frame to prevent vertical displacement of the body frame; and resilient means coacting between the frames to restore their normal relation after displacement.

9. A vehicle comprising, in combination: a wheeled frame comprising center and side sills each formed with flanges projecting laterally and outwardly from the center line of the frame, said flanges cut away at intervals; a body frame movably mounted thereon and formed with corresponding sills overlying the said first named sills and with flanges projecting toward the center line of the frame having similarly cut away portions; the remaining portions of the said respective flanges dimensioned to pass through the cut-away portions of the opposed flanges and lying in substantially vertical registration therewith with the portions on the body frame underlying the portions upon the wheeled frame to prevent vertical displacement of the body frame and resilient means coacting between the frames to restore normal registration thereof after displacement.

JAMES M. HEATH.